(12) United States Patent
Kaya et al.

(10) Patent No.: US 10,324,499 B1
(45) Date of Patent: Jun. 18, 2019

(54) ACTIVE POP-UP FINGER ACCESS IN A PORTABLE INFORMATION HANDLING SYSTEM

(71) Applicant: Dell Products L.P., Round Rock, TX (US)

(72) Inventors: Giray Kaya, Austin, TX (US); Bo Hom, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/046,024

(22) Filed: Jul. 26, 2018

(51) Int. Cl.
| | |
|---|---|
| G06F 1/16 | (2006.01) |
| H01F 7/04 | (2006.01) |
| H01F 7/06 | (2006.01) |
| E05B 47/00 | (2006.01) |
| E05B 65/00 | (2006.01) |

(52) U.S. Cl.
CPC ........ *G06F 1/1656* (2013.01); *E05B 47/0006* (2013.01); *E05B 65/0067* (2013.01); *G06F 1/1616* (2013.01); *G06F 1/1681* (2013.01); *H01F 7/04* (2013.01); *H01F 7/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,366,440 B1* | 4/2002 | Kung | ...................... | E05C 19/16 |
| | | | | 361/147 |
| 6,891,722 B2* | 5/2005 | Chen | ...................... | E05B 63/248 |
| | | | | 335/207 |
| 8,385,057 B2* | 2/2013 | Liu | ...................... | H04M 1/0245 |
| | | | | 361/679.04 |
| 8,638,549 B2* | 1/2014 | Garelli | .................. | G06F 1/1615 |
| | | | | 361/679.26 |
| 8,705,229 B2* | 4/2014 | Ashcraft | ............... | G06F 1/1679 |
| | | | | 312/223.1 |
| 8,798,675 B2* | 8/2014 | Salmon | ............... | H04M 1/0256 |
| | | | | 455/556.1 |
| 9,277,661 B2* | 3/2016 | Andre | .................. | H05K 5/0221 |
| 2002/0105401 A1* | 8/2002 | Shih-Chung | ............ | G06F 1/162 |
| | | | | 335/207 |
| 2007/0133156 A1* | 6/2007 | Ligtenberg | ............ | G06F 1/1616 |
| | | | | 361/679.27 |
| 2007/0138806 A1* | 6/2007 | Ligtenberg | .............. | E05C 19/16 |
| | | | | 292/251.5 |

(Continued)

*Primary Examiner* — Lisa Lea-Edmonds
(74) *Attorney, Agent, or Firm* — Baker Botts L.L.P.

(57) ABSTRACT

Systems and methods for active pop-up finger access in a portable information handling system. The portable system may include a housing having a first housing portion and a second housing portion rotationally coupled by a hinge. The first housing portion may include an electromagnet disposed proximate a front portion of the first housing portion. The second housing portion may include a finger access feature proximate a front portion of the second housing portion and a second magnet disposed proximate the front portion of the second housing portion. The processor may, when a sensor detects a finger of a user proximate the finger access feature, activate the electromagnet to create a magnetic repulsion force with the first magnet. The magnetic repulsion force may cause the portable information handling system to move from a closed position to a finger access open position.

18 Claims, 6 Drawing Sheets

(56) References Cited

U.S. PATENT DOCUMENTS

| | | | | |
|---|---|---|---|---|
| 2008/0158800 A1* | 7/2008 | Aoyagi | ............ | G06F 1/1616 |
| | | | | 361/679.01 |
| 2011/0026203 A1* | 2/2011 | Ligtenberg | ............ | E05C 19/16 |
| | | | | 361/679.01 |
| 2013/0107431 A1* | 5/2013 | Xu | ............ | G06F 1/1616 |
| | | | | 361/679.01 |
| 2017/0017273 A1* | 1/2017 | Weldon | ............ | G06F 1/1681 |

* cited by examiner

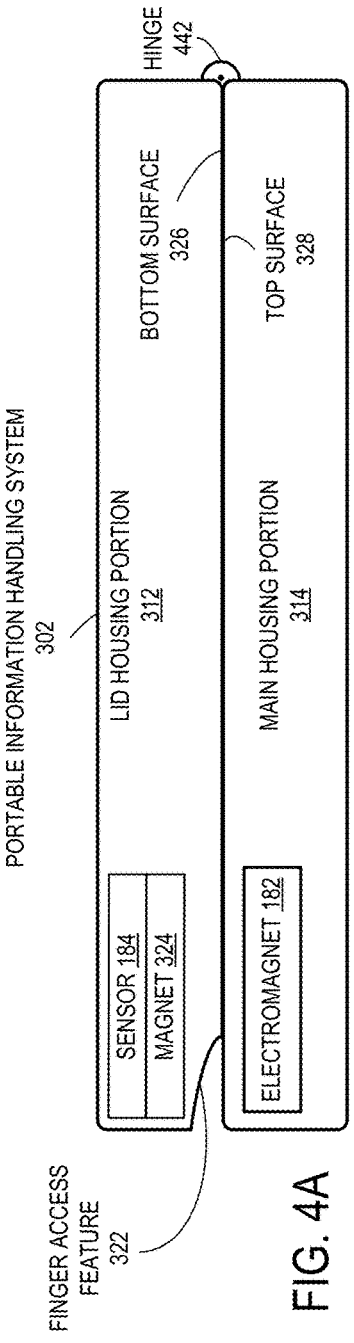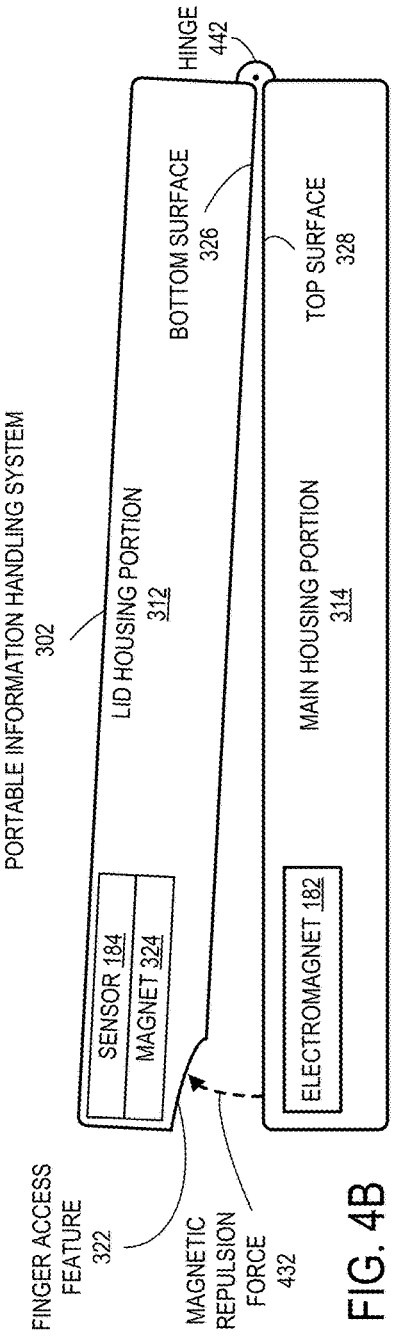

METHOD FOR OPENING A PORTABLE INFORMATION HANDLING SYSTEM HAVING
ACTIVE POP-UP FINGER ACCESS

500

502 — DETECTING, BY A SENSOR OF A PORTABLE INFORMATION HANDLING SYSTEM, A FINGER OF A USER PROXIMATE A FINGER ACCESS FEATURE

504 — ACTIVATING, BY A PROCESSOR OF THE PORTABLE INFORMATION HANDLING SYSTEM, AN ELECTROMAGNET OF A FIRST HOUSING PORTION OF A HOUSING TO CREATE A MAGNETIC REPULSION FORCE WITH A SECOND MAGNET OF A SECOND HOUSING PORTION OF THE HOUSING, IN RESPONSE TO DETECTING THE FINGER OF THE USER PROXIMATE THE FINGER ACCESS FEATURE

506 — CAUSING, BY THE MAGNETIC REPULSION FORCE, THE PORTABLE INFORMATION HANDLING SYSTEM MOVING FROM A CLOSED POSITION TO A FINGER ACCESS OPEN POSITION

FIG. 5

ACTIVE POP-UP FINGER ACCESS IN A PORTABLE INFORMATION HANDLING SYSTEM

BACKGROUND

Field of the Disclosure

This disclosure relates generally to information handling systems and, more particularly, to active pop-up finger access in a portable information handling system.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs, and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed portable information handling system may include a housing having a first housing portion and a second housing portion rotationally coupled by a hinge. The first housing portion may include an electromagnet disposed proximate a front portion of the first housing portion. The second housing portion may include a finger access feature proximate a front portion of the second housing portion and a second magnet disposed proximate the front portion of the second housing portion. The portable information handling system may also include a sensor disposed proximate a front portion of the housing and a processor. The processor may, when the sensor detects a finger of a user proximate the finger access feature, activate the electromagnet to create a magnetic repulsion force with the first magnet. The magnetic repulsion force may cause the portable information handling system to move from a closed position to a finger access open position.

In a number of the disclosed embodiments of the portable information handling system, activation of the electromagnet may further include the processor to control a level of current supplied to the electromagnet for a duration of time that may cause the magnetic repulsion force to move the portable information handling system to the finger access open position. When the duration of time expires, the processor may deactivate the electromagnet.

In a number of the disclosed embodiments of the portable information handling system, the finger access open position may correspond to a displacement between the front portion of the first housing portion and the front portion of the second housing portion.

In a number of the disclosed embodiments of the portable information handling system, activation of the electromagnet may further include the processor to control a level of current supplied to the electromagnet between a first level of current and a second level of current over a duration of time that may reduce the magnetic repulsion force. The first level of current may be greater than the second level of current. The reduction of the magnetic force may cause the portable information system to move from the finger access open position to the closed position.

In a number of the disclosed embodiments of the portable information handling system, when the portable information handling system is in the finger access open position, the portable information handling system may be enabled to be opened by the finger of the user.

In a number of the disclosed embodiments of the portable information handling system, the sensor may be disposed proximate the front portion of the first housing portion and the finger access feature.

In a number of the disclosed embodiments of the portable information handling system, the sensor may be disposed proximate the front portion of the second housing portion and the finger access feature.

In a number of the disclosed embodiments of the portable information handling system, the sensor may comprise a proximity sensor, a human presence sensor, or a contact sensor.

In a number of the disclosed embodiments of the portable information handling system, the first magnet may comprise a neodymium magnet, a rare earth magnet, or a ferromagnetic magnet.

In a second embodiment, a disclosed method may include, in a portable information handling system that may include a housing having a first housing portion and a second housing portion rotationally coupled by a hinge, the first housing portion may include an electromagnet disposed proximate a front portion of the first housing portion, the second housing portion may include a finger access feature proximate a front portion of the second housing portion and a second magnet disposed proximate the front portion of the second housing portion, and the portable information handling system may also include a sensor disposed proximate a front portion of the housing and a processor, detecting, by the sensor, a finger of a user proximate the finger access feature. The method may also include activating, by the processor, the electromagnet to create a magnetic repulsion force with the first magnet, in response to detecting the finger of the user proximate the finger access feature. The method may further include causing, by the magnetic repulsion force, the portable information handling system moving from a closed position to a finger access open position.

In a number of the disclosed embodiments of the method, activating the electromagnet may further include controlling a level of current supplied to the electromagnet for a duration of time causing the magnetic repulsion force to move the portable information handling system to the finger access open position and when the duration of time expires, deactivating the electromagnet.

In a number of the disclosed embodiments of the method, the finger access open position may correspond to a displacement between the front portion of the first housing portion and the front portion of the second housing portion.

In a number of the disclosed embodiments of the method, activation of the electromagnet may further include controlling a level of current supplied to the electromagnet between a first level of current and a second level of current over a duration of time reducing the magnetic repulsion force. The first level of current may be greater than the second level of current. Reducing the magnetic force may cause the portable information system to move from the finger access open position to the closed position.

In a number of the disclosed embodiments of the method, when the portable information handling system is in the finger access open position, the portable information handling system may be enabled to be opened by the finger of the user.

In a number of the disclosed embodiments of the method, the sensor may be disposed proximate the front portion of the first housing portion and the finger access feature.

In a number of the disclosed embodiments of the method, the sensor may be disposed proximate the front portion of the second housing portion and the finger access feature.

In a number of the disclosed embodiments of the method, the sensor may comprise a proximity sensor, a human presence sensor, or a contact sensor.

In a number of the disclosed embodiments of the method, the first magnet may comprise a neodymium magnet, a rare earth magnet, or a ferromagnetic magnet.

BRIEF DESCRIPTION OF THE DRAWINGS

For a more complete understanding of the present invention and its features and advantages, reference is now made to the following description, taken in conjunction with the accompanying drawings, in which:

FIGS. 4A, 4B, and 4C are side views of selected elements of an embodiment of a portable information handling system in various positions; and FIG. 5 is a flow chart of selected elements of a method for opening a portable information handling system having active pop-up finger access.

Figure 1:
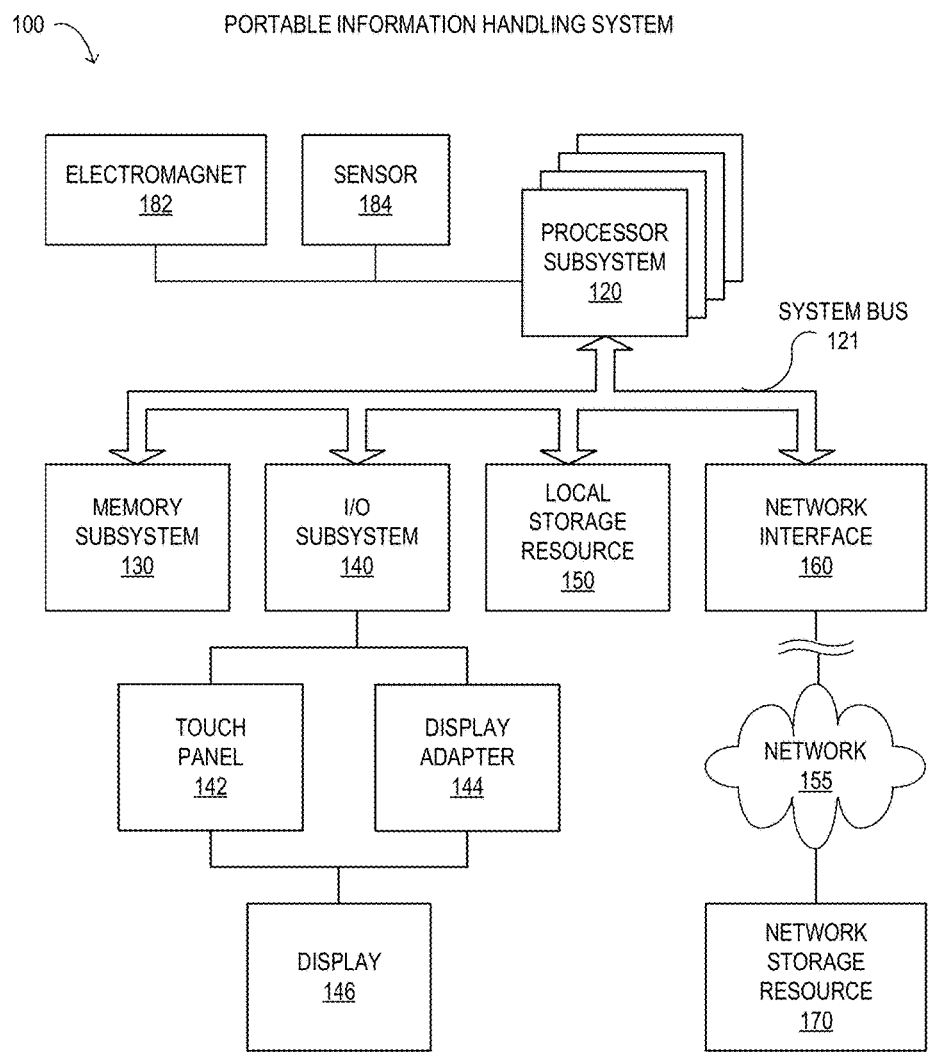
FIG. 1 is a block diagram of selected elements of an embodiment of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3A, 3B, 4A, 4B, 4C, and 5 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of portable information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Components of portable information handling system 100 may also comprise an electromagnet 182 and a sensor 184. Sensor 184 may comprise a proximity sensor, a human presence sensor, or a contact sensor.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of portable information handling system). In the same or alternative embodiments, processor subsystem 120 may interpret and/or execute program instructions and/or process data stored remotely (e.g., in network storage resource 170).

Also, in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated portable information handling system, such as portable information handling system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between portable information handling system 100 and a network 110. Network interface 160 may enable portable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from portable information handling system 100.

In particular embodiments, network 110 may include one or more routers for routing data between portable information handling system 100 and another information handling system. A device (e.g., portable information handling system 100 or another information handling system) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. Portable information handling system 100 may communicate with one or more other information handling systems via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Portable information handling systems may include one or more physical features such as cuts or protrusions may enable a user to open the portable information handling to an open position from a closed position. However, these physical design features may detract from the aesthetics of the system. There is also demand for much thinner and light weight portable information handling systems. In these thinner portable information handling system designs, these physical features are either becoming too small to benefit the user or are being eliminated completely, which makes single-handed opening of the systems more difficult or impossible to accomplish. Typical portable information handling system include a sliding latch located on a hinge-up housing portion or lid housing portion of a housing. Once the sliding latch is unlatched, the lid housing portion springs up a few millimeters (mm) to provide the user with a grip zone. In some portable information handling systems, a spring-loaded slider subassembly, latch holes in a palm-rest, and a protruding hook at the hinge up portion of the housing proximate a camera is required to provide a grip area for the user. In other portable information handling systems, a hinge-up portion of the housing with a profile that protrudes above a base portion of the housing is required. The drawback to these typical designs is that the liquid crystal display (LCD) panel exposure to impacts is increased and the severity of these impacts is significantly increased. The drop severity is also increased because during a drop event, the hinge-up portion of the housing bears all of the force of impact causing the hinge-down portion of the housing, the base portion of the housing, to make contact, which may cause the LCD to be damaged.

As will be described in further detail herein, the inventors of the present disclosure have discovered systems and methods to provide active pop-up finger access in a portable information handling system. This solution may include portable information handling system including a housing having a main housing portion and a lid housing portion rotationally coupled by a hinge, a sensor, and a processor. The main housing portion may include an electromagnet. The lid housing portion may include a finger access feature and a magnet. When the sensor detects a finger of a user's hand, the process may activate the electromagnet to create a magnetic repulsion force with the magnet. The magnetic repulsion force may cause the portable information handling system to move from a closed position to a finger access open position, which enables the user to grip the finger access feature with their finger and open the portable information to an open position. This solution eliminates the need for moving parts such as a sliding latch and a hook, which presents a minimalist and clean finish to the portable information handling system. This solution provides a more usable finger access to open the portable information handling system, an easy, quick, and single-handed access to open the portable information system, and a more rugged design to mitigate or eliminate damage caused by a drop impact event as the lid housing portion and the finger access feature do not protrude beyond the main housing portion of the portable information system, and may take advantage of magnets that are already a part of current portable information handling systems.

Figure 2:
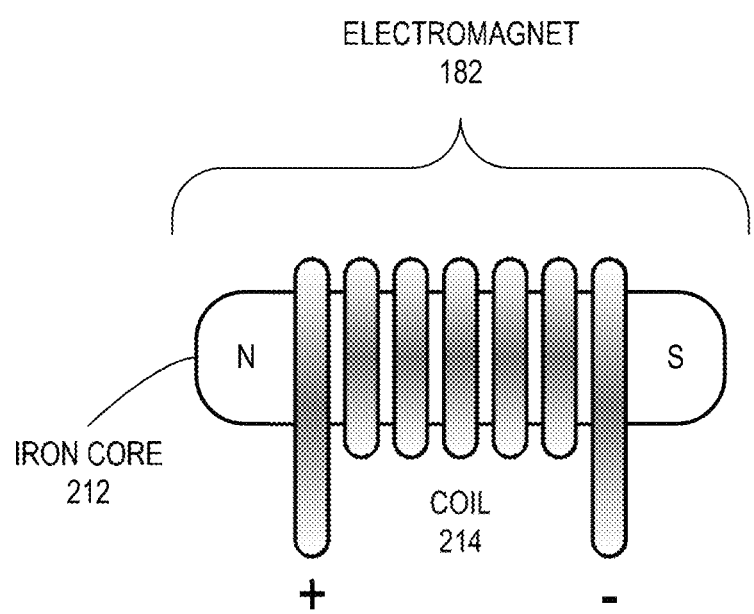
FIG. 2 is a block diagram of selected elements of an embodiment of an electromagnet.

Turning now to FIG. 2, a block diagram depicting selected elements of an embodiment of electromagnet 186 is illustrated. Electromagnet 182 may include an iron core 212 and a coil 214. The strength of a magnetic repulsion force of electromagnet 182 with another magnet may vary based on the amount of current flowing through coil 214. Portable information handling system 100 may receive an alternating current (A/C) from an A/C power source and may include a rectifier to convert the A/C power to a direct current (DC). A processor of portable information handling system 100 may control a level of current to coil 214 of electromagnet 182 to vary a magnetic field strength and activate and deactivate electromagnet 182.

Figure 3A:
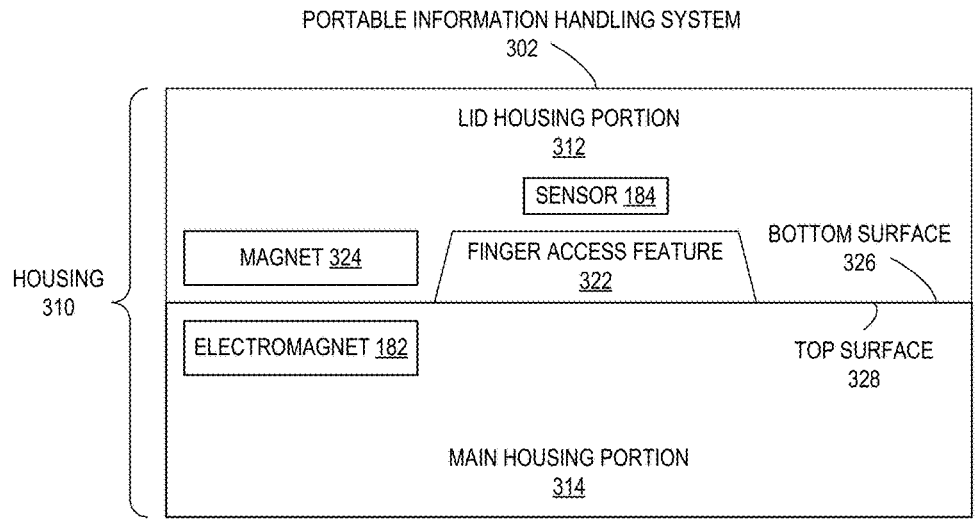
FIGS. 3A and 3B are front views of selected elements of an embodiment of a portable information handling system in various positions.
Figure 3B:
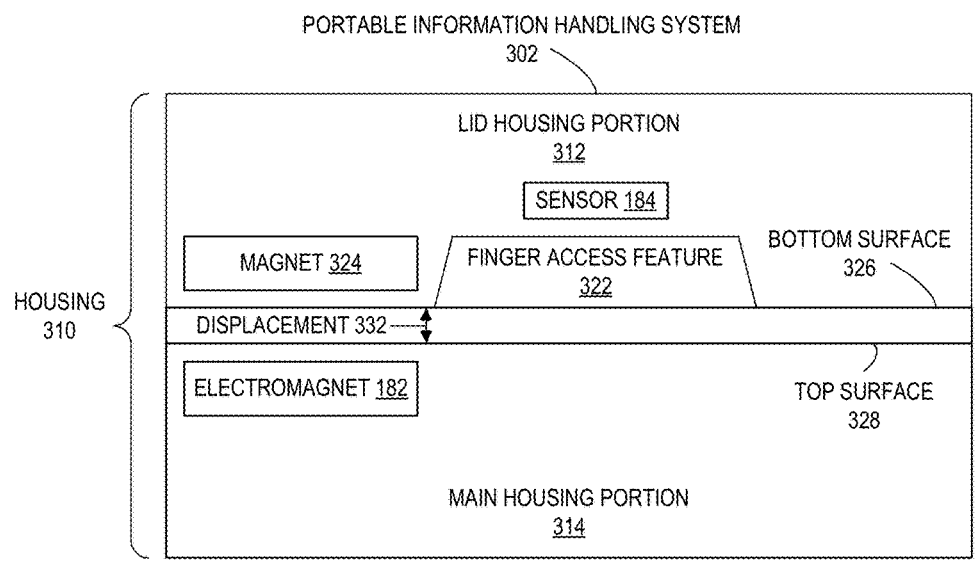

Turning now to FIGS. 3A and 3B, front views of selected elements of an embodiment of a portable information handling system 302 in various positions are illustrated. It is noted that FIGS. 3A and 3B are not drawn to scale but are schematic illustrations. Portable information handling system 302 may be functionally and structurally similar to portable information handling system 100 with reference to FIG. 1. Portable information handling system 302 may comprise, but are not limited to, a housing 310 including a lid housing portion 312 and a main housing portion 314 rotationally coupled by a hinge (not shown). Lid housing portion 312 may include a finger access feature 322 proximate a front portion of lid housing portion 312, a magnet 324 disposed proximate the front portion of lid housing portion 312, and a bottom surface 326. Main housing portion 314 may include electromagnet 182 disposed proximate a front portion of main housing portion 314 and a top surface 328. Portable information handling system 302 may also include sensor 184 disposed proximate a front portion of housing 310 and a processor. In one or more embodiments, sensor 184 may be disposed proximate the front portion of lid housing portion 312 and finger access feature 322. In one or more other embodiments, sensor 184 may be disposed proximate the front portion of main housing portion 314 and finger access feature 322, which may reduce the amount of cabling required to couple sensor 184 to the processor. Finger access feature 322 may comprise an indentation in the front portion of lid housing portion 312, a protrusion in the front portion of lid housing portion 312, or combinations thereof, or another type of finger access feature. Finger access feature 322 may be configured to allow a finger of a user to grip finger access feature 322 when the portable information handling system 302 is in a finger access open position. In some embodiments, finger access feature 322 may be optional and a finger of a user may be inserted between the displacement between the front portion of lid housing portion 312 and the front portion of main housing portion 314 when the portable information handling system 302 is in a finger access open position. Magnet 324 may comprise a neodymium magnet, a rare earth magnet, or a ferromagnetic magnet.

In FIG. 3A, portable information handling system 302 is shown in a closed position. When portable information handling system 302 is in the closed position, top surface 328 of main housing portion 314 faces bottom surface 326 of lid housing portion 312 and top surface 328 and bottom surface 326 may be in contact with each other. In FIG. 3B, portable information handling system 302 is shown in the finger access open position. When portable information handling system 302 is in the finger access open position, top surface 328 of main housing portion 314 generally faces bottom surface 326 of lid housing portion 312 at an angular position relative to each other, a front portion of top surface 328 of main housing portion 314 and a front portion of bottom surface 326 of lid housing portion 312 may be displaced from each other by a displacement 322, and a back portion of top surface 328 of main housing portion 314 and a back portion of bottom surface 326 of lid housing portion 312 may generally be in contact with each or displaced from each other based on the hinge coupling main housing portion 314 and lid housing portion 312 and their angular position relative to each other.

During operation, when portable information handling system 302 is in the closed position, shown in FIG. 3A, a user may bring a finger in proximity to finger access feature 322 in order to open portable information handling system 302. In response, sensor 184 may detect the finger of the user proximate finger access feature 322. For example, the user's finger may be in proximity to finger access feature 322 and sensor 184 may detect the presence of the user's finger in proximity of finger access feature 322. As another example, the user's finger may contact finger access feature 322 and sensor 184 may detect that the user's finger is in contact with finger access feature 322. When sensor 184 detects the finger of the user the processor of portable information handling system 302 may activate electromagnet 182 to create a magnetic repulsion force with magnet 324. The magnetic repulsion force may cause portable information handling system 302 to move from the closed position shown in FIG. 3A to the finger access open position depicted in FIG. 3B which may result in a displacement 332 between the front portion of bottom surface 326 of lid housing portion 312 and the front portion of top surface 328 of main housing portion 314. Moving portable information handling system 302 to the finger access open position, enables portable information handling system 302 to be opened by the finger of the user. In one or more embodiments, displacement 332 may range from a displacement of 3 mm to a displacement of 5 mm. In other embodiments, displacement 322 may be another displacement value which may be based on an appropriate displacement value that enables the user to grip finger access feature 322 and open portable information handling system 302.

The processor may activate electromagnet 182 by controlling a level of current supplied to electromagnet 182 for a duration of time to cause the magnetic repulsion force to move portable information handling system 302 to the finger access open position. When the duration of time expires, the processor may deactivate electromagnet 182. In one or more embodiments, the duration of time may have a value that ranges from 1 second to 3 seconds. In other embodiments, the duration of time may be set to another appropriate value that provides enough time for the user to grip finger access feature 322 when portable information handling system 302 moves to the finger access open position and open portable information handling system 302.

In one or more other embodiments, the processor may activate electromagnet 182 by controlling a level of current supplied to electromagnet 182 between a first level of current and a second level of current over a duration of time that may cause the magnetic repulsion force to be reduced over the duration of time. The first level of current may correspond to the level of current that causes the magnetic repulsion force to move portable information handling system 302 to the finger access open position. The second level of current may correspond to the level of current that causes the magnetic repulsion force to be reduced that allows portable information handling system 302 to move to the closed position. The second level of current may be 0 Amperes and the magnetic repulsion force may be eliminated. The reduction of the magnetic force over the duration of time may cause portable information system 302 to move from the finger access open position when the first level of current is supplied to electromagnet 182 to the closed position when the second level of current is supplied to electromagnet 182. Reducing the magnetic force over a duration of time may prevent bottom surface of lid housing portion 312 from closing to rapidly and prevent any damage to portable information handling system 302.

In one or more embodiments, the polarity of electromagnet 182 may be switched by reversing the current supplied to electromagnet 182. Reversing the current supplied to electromagnet 182 may cause portable information system 302 to move from the finger access open position to the closed position and provides a security enhancement. In some embodiments, the polarity of electromagnet 182 may be switched by reversing the current supplied to electromagnet 182 and the reversed current may be supplied continuously to electromagnet 182 which causes electromagnet 182 to be reverse polarized and to act as a lock feature. When portable information system 302 is connected to an A/C line power source, the lock feature may be provided long term. When portable information system 302 draws power from a battery power source, the lock feature may be provided short term, which is dependent on the available battery capacity. For example, a user may leave electromagnet 182 reverse polarized to enable the lock feature while the user is away from portable information system 302.

Figure 4C:
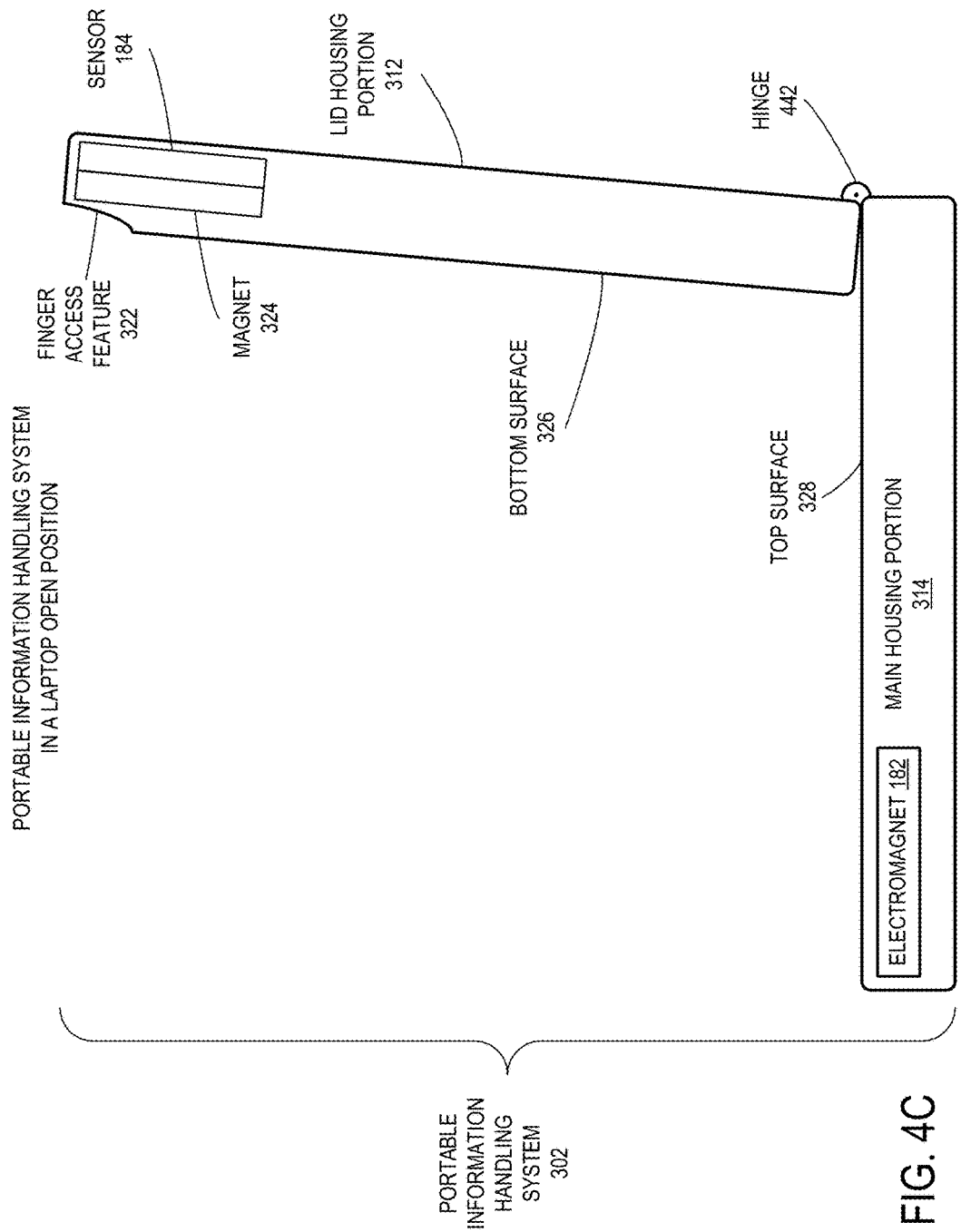

Turning now to FIGS. 4A, 4B, and 4C, side views of selected elements of an embodiment of portable information handling system 302 in various positions are illustrated. As shown, lid housing portion 312 and main housing portion 314 of portable information system 302 are rotationally coupled by a hinge 442. In FIG. 4A, portable information handling system 302 is shown in a closed position. When portable information handling system 302 is in the closed position and sensor 184 has not detected any presence of a finger of a user's hand, electromagnet 182 has been deactivated and there is no magnetic force between electromagnet 182 and magnet 324. In FIG. 4B, sensor 184 detected a finger of a user in proximity of finger access feature 322. In response, the processor of portable information handling system 302 activated electromagnet 182 which caused magnetic repulsion force 432 to move portable information handling system 302 from the closed position of FIG. 4A to the finger access open position of FIG. 4B. When portable information handling system 302 is in the finger access open position, the user may use the detected finger to open portable information handling system 302. FIGURE shows portable information handling system 302 in a laptop open position after the user opened portable information handling system 302 from the finger access open position of FIG. 4B to the laptop open position of FIG. 4C. When portable information handling system 302 is in the laptop open position, electromagnet 182 has been deactivated.

Referring now to FIG. 5, a flow chart of selected elements of a method 500 for opening a portable information handling system having active pop-up finger access, as described herein, is depicted in flowchart form. Method 500 may be performed using portable information handling system 100, portable information handling system 302, or another portable information handling, previously described with reference to FIGS. 1, 3A, 3B, 4A, 4B, and 4C. It is noted that certain operations described in method 500 may be optional or may be rearranged in different embodiments.

Method 500 may begin at step 502, in a portable information handling system that may include a housing having a first housing portion and a second housing portion rotationally coupled by a hinge, the first housing portion may include an electromagnet disposed proximate a front portion of the first housing portion, the second housing portion may include a finger access feature proximate a front portion of the second housing portion and a second magnet disposed proximate the front portion of the second housing portion, and the portable information handling system may also include a sensor disposed proximate a front portion of the housing and a processor, detecting, by the sensor, a finger of a user proximate the finger access feature. At step 504, activating, by the processor, the electromagnet to create a magnetic repulsion force with the first magnet, in response to detecting the finger of the user proximate the finger access feature. At step 506, causing, by the magnetic repulsion force, the portable information handling system moving from a closed position to a finger access open position.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A portable information handling system, comprising:
a housing having a first housing portion and a second housing portion rotationally coupled by a hinge,
the first housing portion including:
an electromagnet disposed proximate a front portion of the first housing portion,
the second housing portion including:
a finger access feature proximate a front portion of the second housing portion; and
a second magnet disposed proximate the front portion of the second housing portion;
a sensor disposed proximate a front portion of the housing; and
a processor to:
when the sensor detects a finger of a user proximate the finger access feature, activate the electromagnet to create a magnetic repulsion force with the first magnet, wherein the magnetic repulsion force causes the portable information handling system to move from a closed position to a finger access open position.

2. The portable information handling system of claim 1, wherein activation of the electromagnet further comprises the processor to:
control a level of current supplied to the electromagnet for a duration of time to cause the magnetic repulsion force to move the portable information handling system to the finger access open position; and
when the duration of time expires, deactivate the electromagnet.

3. The portable information handling system of claim 1, wherein the finger access open position corresponds to a displacement between the front portion of the first housing portion and the front portion of the second housing portion.

4. The portable information handling system of claim 1, wherein activation of the electromagnet further comprises the processor to:
control a level of current supplied to the electromagnet between a first level of current and a second level of current over a duration of time to reduce the magnetic repulsion force,
wherein the first level of current is greater than the second level of current, and
wherein the reduction of the magnetic force causes the portable information system to move from the finger access open position to the closed position.

5. The portable information handling system of claim 1, wherein, when the portable information handling system is in the finger access open position, the portable information handling system is enabled to be opened by the finger of the user.

6. The portable information handling system of claim 1, wherein the sensor is disposed proximate the front portion of the first housing portion and the finger access feature.

7. The portable information handling system of claim 1, wherein the sensor is disposed proximate the front portion of the second housing portion and the finger access feature.

8. The portable information handling system of claim 1, wherein the sensor comprises a proximity sensor, a human presence sensor, or a contact sensor.

9. The portable information handling system of claim 1, wherein the first magnet comprises a neodymium magnet, a rare earth magnet, or a ferromagnetic magnet.

10. A method, comprising:
in a portable information handling system comprising:
a housing having a first housing portion and a second housing portion rotationally coupled by a hinge,
the first housing portion including:
an electromagnet disposed proximate a front portion of the first housing portion,
the second housing portion including:
a finger access feature proximate a front portion of the second housing portion; and
a second magnet disposed proximate the front portion of the second housing portion;
a sensor disposed proximate a front portion of the housing; and
a processor,
detecting, by the sensor, a finger of a user proximate the finger access feature;
activating, by the processor, the electromagnet to create a magnetic repulsion force with the first magnet, in response to detecting the finger of the user proximate the finger access feature; and
causing, by the magnetic repulsion force, the portable information handling system moving from a closed position to a finger access open position.

11. The method of claim 10, wherein activating the electromagnet further comprises:
controlling a level of current supplied to the electromagnet for a duration of time causing the magnetic repulsion force to move the portable information handling system to the finger access open position; and
when the duration of time expires, deactivating the electromagnet.

12. The method of claim 10, wherein the finger access open position corresponds to a displacement between the front portion of the first housing portion and the front portion of the second housing portion.

13. The method of claim 10, wherein activation of the electromagnet further comprises:
controlling a level of current supplied to the electromagnet between a first level of current and a second level of current over a duration of time reducing the magnetic repulsion force,
wherein the first level of current is greater than the second level of current, and
wherein reducing the magnetic force causes the portable information system to move from the finger access open position to the closed position.

14. The method of claim 10, wherein, when the portable information handling system is in the finger access open position, the portable information handling system is enabled to be opened by the finger of the user.

15. The method of claim 10, wherein the sensor is disposed proximate the front portion of the first housing portion and the finger access feature.

16. The method of claim 10, wherein the sensor is disposed proximate the front portion of the second housing portion and the finger access feature.

17. The method of claim 10, wherein the sensor comprises a proximity sensor, a human presence sensor, or a contact sensor.

18. The method of claim 10, wherein the first magnet comprises a neodymium magnet, a rare earth magnet, or a ferromagnetic magnet.

* * * * *